No. 771,321. PATENTED OCT. 4, 1904.
H. G. PAPE.
GAS STOVE.
APPLICATION FILED NOV. 18, 1903.
NO MODEL.
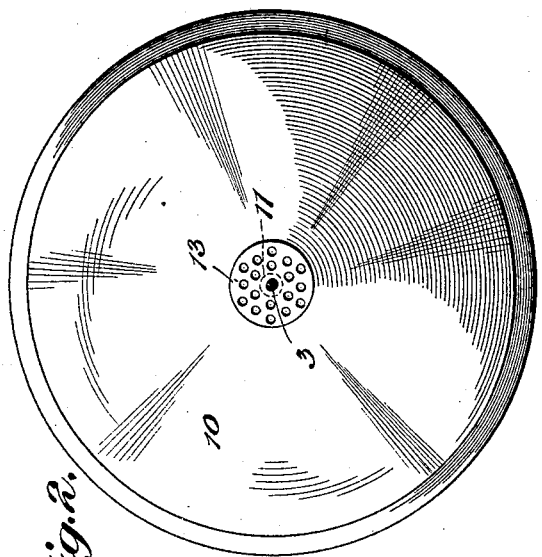
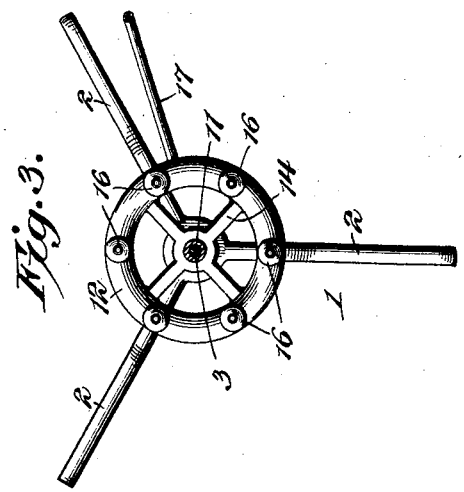
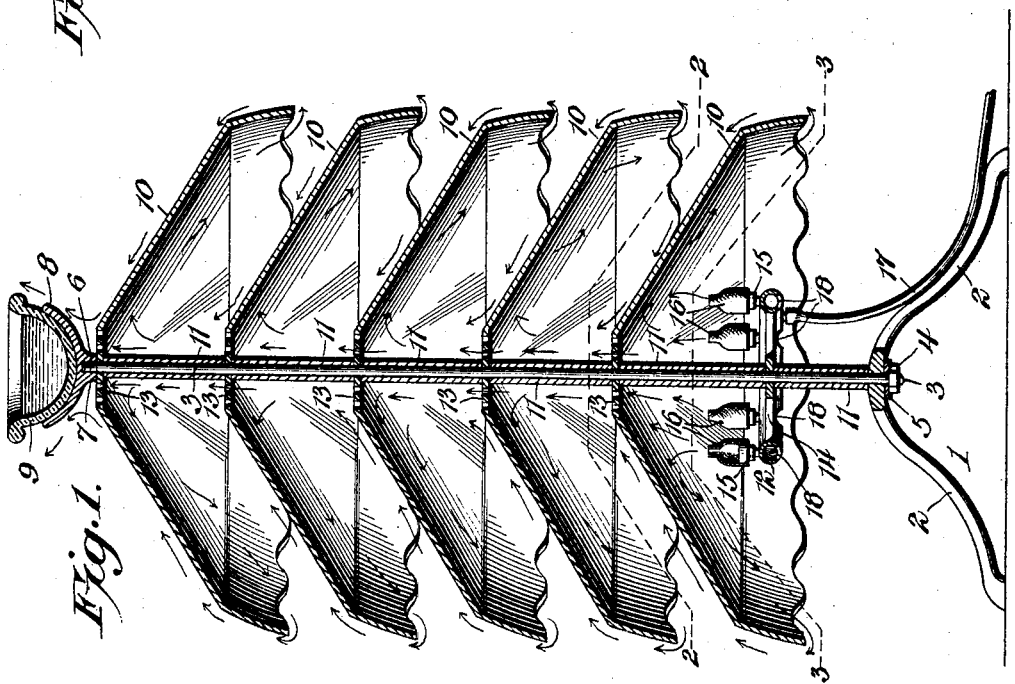
Herman G. Pape, Inventor,
Witnesses
Howard W. Orr
H. F. Riley
By E. G. Siggers
Attorney No. 771,321.

Patented October 4, 1904.

UNITED STATES PATENT OFFICE.

HERMAN G. PAPE, OF NEW YORK, N. Y.

GAS-STOVE.

SPECIFICATION forming part of Letters Patent No. 771,321, dated October 4, 1904.

Application filed November 18, 1903. Serial No. 181,672. (No model.)

*To all whom it may concern:*

Be it known that I, HERMAN G. PAPE, a citizen of the United States, residing at New York, in the county of New York and State of New York, have invented a new and useful Gas-Stove, of which the following is a specification.

The invention relates to improvements in gas-stoves.

The object of the present invention is to improve the construction of gas-stoves and to provide a simple, inexpensive, and efficient one which will be strong and durable and which will be economical in the consumption of gas.

A further object of the invention is to provide a stove of this character which will afford a maximum amount of heat for a given quantity of gas and which will be adapted for both lighting and heating purposes.

Another object of the invention is to provide a gas-stove designed particularly for heating apartments or rooms and capable of producing a rapid circulation in a room and of quickly heating the same.

With these and other objects in view the invention consists in the construction and novel combination and arrangement of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a vertical sectional view of a gas-stove constructed in accordance with this invention. Fig. 2 is a horizontal sectional view taken substantially on the line 2 2 of Fig. 1 and illustrating the construction of one of the conical shells or hoods. Fig. 3 is a similar view taken substantially on the line 3 3 of Fig. 1 and illustrating the construction of the burner and the stand.

Like numerals of reference designate corresponding parts in all the figures of the drawings.

1 designates a base or stand consisting of legs 2, centrally connected and formed integral with one another, the stand or base being preferably a single casting; but any other form of stand or base may be employed, as will be readily understood. The center of the stand is pierced by the lower end of a vertical rod 3, having a lower threaded end receiving a nut 4, which engages a washer 5, that is interposed between the nut and the lower face of the center of the stand or base. The rod may be of any desired length, and its upper end 6 is threaded and fits in a socket 7 of an urn 8, constructed of metal and preferably provided with a porcelain receptacle 9, which is also in the form of an urn and which is adapted to hold a quantity of water. The vertical rod or standard forms a support for a series of approximately frusto-conical shells 10, constructed of sheet metal, cast-iron, or any other suitable material, and supported by tubular sections 11, which are disposed on the vertical rod or standard, as clearly illustrated in Fig. 1 of the drawings. The lowermost tubular section is adapted to receive and support a burner 12, and the second tubular section is placed on the rod or standard after the bottom tubular section and the burner have been arranged thereon. The lowermost shell is then placed on the rod or standard, and the other tubular sections and shells are successively arranged on the same. The rod may be of any desired length, and any number of shells may be employed to provide a gas-stove of the desired heating capacity. Each tapering shell or hood is provided with a scalloped lower edge, and it has a horizontal top portion 13, provided with a cluster of fine perforations forming vents or passages for the escape of the heated air. The inclined body portions of the shells or hoods are imperforate and are exposed, as shown, no surrounding casing being employed and the heater being adapted to suck or draw in the surrounding air, whereby the same is rapidly heated. The stove in this manner is adapted to cause the circulation of air in a room or apartment, the circulation being substantially as indicated by the arrows in Fig. 1 of the drawings. The surrounding air is drawn inward below the hoods or shells and is heated, a portion of the heated air passing directly upward through the apertures of the top horizontal portions of the said shells or hoods and the greater portion of the air passing downward around the lower edges of the hoods or shells, as indicated by the said arrows. In this manner a large volume of air is rapidly heated, and as the air comes directly in contact with the heated surfaces of the shells or hoods the heating of a room is effected at the expenditure of a minimum amount of fuel.

The burner 12 is of the Bunsen type, and it consists of an annular tube or body portion and a connecting web or spider 14, which is provided with a central perforation for the rod or standard. The annular body or casing is provided at the top with a series of projecting nipples 15 for the reception of asbestos mantles 16, forming burners, as clearly illustrated in Fig. 1 of the drawings. A gas-pipe 17 is connected with the body portion or casing of the burner, at one side thereof, for supplying gas, and the said body portion or casing is provided at its bottom with a series of apertures 18, adapted to admit air into the casing, the air and gas mixing in the usual manner. Instead of employing asbestos in the construction of the mantles any other suitable similar material may be used, as will be readily understood. The gas-pipe 17 may be constructed of flexible material and provided with means for enabling it to be connected with a burner or other suitable source of supply, whereby the stove may be connected with the gas-supply of a house or building without necessitating any alteration in the construction of the usual supply-pipes and burners. The asbestos mantles of the burner become highly heated and are adapted to afford light, and any desired number of mantles may be provided to secure the desired lighting power.

The nut and the threaded socket of the metallic urn or receptacle support 8 detachably secure the parts of the heater together and enable the same to be rigidly clamped in the position illustrated in Fig. 1 of the drawings.

It will be seen that the device, which is exceedingly simple and inexpensive in construction, possesses great strength and durability, that it is adapted for both lighting and heating, and that it is capable of securing a maximum amount of heat from a given amount of fuel. Furthermore, it will be clear that as the tapering shells or hoods are open or exposed the heater is adapted to rapidly suck in the surrounding air, and that it is capable of creating a circulation in a room or apartment and of quickly heating the same.

After the burner is lighted the air and gas, which are mixed, are heated before they are consumed. The lower conical shell keeps the burner completely surrounded by intensely hot air and heats the gas as it flows into the pipe or body of the burner and expands the gas before the same is consumed, thereby lessening the consumption of gas. The stove consumes less gas than those stoves in which the gas is not heated before it is consumed, and more intense heat is obtained by heating the air and gas previous to combustion.

Having thus fully described my invention, what I claim as new, and desire to secure by Letters Patent, is—

1. A combined lighting and heating stove, comprising a vertical series of approximately frusto-conical shells spaced apart, and each having a cluster of fine perforations at the top portion for the passage of the products of combustion, said shells being also provided at the top portion with openings, a burner located beneath the series of shells, a standard passing through the openings and closing the same to the passage of the products of combustion, whereby the same are caused to pass both through the said perforations and around the lower edges of the shells, and means for maintaining the shells in their spaced relation, substantially as described.

2. A combined lighting and heating stove, comprising a standard, a vertical series of approximately frusto-conical hoods or shells pierced by the standard and exteriorly arranged, a series of spacing-tubes disposed on the standard and supporting the hoods or shells, and a burner, substantially as described.

3. A combined lighting and heating stove comprising a stand having an upright standard, a vertical series of approximately frusto-conical hoods or shells pierced by the standard and exteriorly arranged, a series of spacing-tubes disposed on the standard and supporting the hoods or shells, and a burner also supported by the standard, substantially as described.

4. A combined heating and lighting stove comprising a stand having an upright standard, a series of approximately frusto-conical hoods or shells mounted on the standard, and a burner located beneath the hoods or shells and consisting of a casing provided with nipples and having mantles fitted on the nipples, said burner being also provided with air and gas supply apertures, substantially as described.

5. A combined lighting and heating stove provided with a series of hoods or shells and having a supporting-standard and a burner consisting of a tubular body surrounding the standard and provided with air-inlet apertures and having means for supplying gas, said burner being also provided with a mantle, substantially as described.

6. A combined lighting and heating stove comprising a stand having a rod, a burner arranged on the rod and composed of a tubular body having a web or spider and provided with bottom inlet-apertures, and mantles arranged upon the tubular body, and a vertical series of shells or hoods mounted on the rod and spaced apart, substantially as described.

7. A combined lighting and heating stove comprising a base or stand having an upright rod, a burner having a web or spider arranged on the rod, a series of exteriorly-arranged hoods or shells also mounted on the rod, tubular sections supporting the burner and the shells or hoods and arranged on the rod, and means for clamping the parts together and for holding the same on the rod, substantially as described.

8. A combined lighting and heating stove comprising a base or stand having an upright rod, a burner arranged on the rod, a vertical series of exteriorly-arranged hoods or shells spaced apart and pierced by the rod, tubular sections mounted on the rod and supporting the burner and the shells or hoods, an urn-shaped member having a socket to receive the upper end of the rod and provided with means for engaging the same, and a receptacle supported by the said member and fitted therein, substantially as described.

In testimony that I claim the foregoing as my own I have hereto affixed my signature in the presence of two witnesses.

HERMAN G. PAPE.

Witnesses:
 FRED BUCK,
 GUS BUCK.